United States Patent
Kishi et al.

(10) Patent No.: US 9,659,112 B2
(45) Date of Patent: May 23, 2017

(54) PIPELINE STRUCTURE AND COMPUTER READABLE RECORDING MEDIUM HAVING RECORDED THEREON PROGRAM FOR PIPELINE STRUCTURE

(71) Applicant: KUBOTA CORPORATION, Osaka-shi, Osaka (JP)

(72) Inventors: Shozo Kishi, Amagasaki (JP); Shogo Kaneko, Amagasaki (JP); Keita Oda, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 76 days.

(21) Appl. No.: 14/564,233

(22) Filed: Dec. 9, 2014

(65) Prior Publication Data

US 2015/0362103 A1   Dec. 17, 2015

(30) Foreign Application Priority Data

Jun. 13, 2014   (JP) .................................. 2014-122615

(51) Int. Cl.
| | |
|---|---|
| *F16L 21/02* | (2006.01) |
| *G06F 17/50* | (2006.01) |
| *F16L 21/04* | (2006.01) |
| *F16L 27/10* | (2006.01) |
| *F16L 37/088* | (2006.01) |

(52) U.S. Cl.
CPC .............. *G06F 17/50* (2013.01); *F16L 21/04* (2013.01); *F16L 27/1017* (2013.01); *F16L 37/088* (2013.01); *G06F 2217/34* (2013.01)

(58) Field of Classification Search
CPC ...... G06F 17/50; G06F 2217/34; F16L 21/04; F16L 37/088; F16L 27/1017
USPC ................................................ 285/154.2, 374
See application file for complete search history.

(56) References Cited

U.S. PATENT DOCUMENTS

| | | | | |
|---|---|---|---|---|
| 1,715,436 A | * | 6/1929 | Taylor .................... | F16L 21/04 |
| | | | | 285/342 |
| 1,783,605 A | * | 12/1930 | Della ....................... | F16L 9/10 |
| | | | | 138/177 |

(Continued)

FOREIGN PATENT DOCUMENTS

| | | |
|---|---|---|
| JP | 09-053775 A | 2/1997 |
| JP | 09-264453 A | 10/1997 |

(Continued)

*Primary Examiner* — Basil Katcheves
*Assistant Examiner* — Joshua Ihezie
(74) *Attorney, Agent, or Firm* — Oliff PLC

(57) ABSTRACT

There are provided a pipeline structure and a computer readable recording medium having recorded thereon a program that supports the design of the pipeline structure. The pipeline structure includes two collars and a plurality of short pipes. The plurality of short pipes are connected by joint structures. Two collars are arranged to sandwich a zone where a fault displacement is expected to occur, and thereby, a ground displacement in the pipe axis direction is dealt with (absorbed). The plurality of short pipes are connected by the larger number of joints than the number of joints in the case of arranging a long pipe. By increasing the number of joints, it becomes easier to deal with (absorb) a ground displacement in the direction perpendicular to a pipe axis.

11 Claims, 13 Drawing Sheets

(56) References Cited

U.S. PATENT DOCUMENTS

| | | | | |
|---|---|---|---|---|
| 2,898,131 A * | 8/1959 | Kurtz | ............. | F16L 21/03 |
| | | | | 277/625 |
| 3,162,214 A * | 12/1964 | Bazinet, Jr. | ......... | A61B 1/0055 |
| | | | | 138/120 |
| 3,637,239 A * | 1/1972 | Daniel | ............. | F16L 37/088 |
| | | | | 285/230 |
| 3,920,268 A * | 11/1975 | Stewing | ............. | B29C 65/42 |
| | | | | 138/155 |
| 3,920,270 A * | 11/1975 | Babb, Jr. | ............. | F16L 17/035 |
| | | | | 285/104 |
| 4,321,967 A * | 3/1982 | Koppe | ............. | E21F 7/00 |
| | | | | 166/250.01 |
| 4,335,752 A * | 6/1982 | Sumner | ............. | F16L 55/1608 |
| | | | | 138/155 |
| 4,396,797 A * | 8/1983 | Sakuragi | ............. | F16L 11/18 |
| | | | | 138/110 |
| 4,474,726 A * | 10/1984 | Ohta | ............. | B29C 57/02 |
| | | | | 138/109 |
| 4,527,322 A * | 7/1985 | Jackson | ............. | B23D 47/12 |
| | | | | 138/97 |
| 4,826,354 A * | 5/1989 | Adorjan | ............. | F16L 1/16 |
| | | | | 138/106 |
| 5,261,461 A * | 11/1993 | Smith | ............. | F16L 55/1657 |
| | | | | 137/615 |
| 6,131,954 A * | 10/2000 | Campbell | ............. | B29C 65/342 |
| | | | | 285/21.1 |
| 9,121,529 B2 * | 9/2015 | Machado | ............. | F16L 1/26 |
| 2012/0242079 A1 * | 9/2012 | Kern-Emmerich | ... | F16L 37/148 |
| | | | | 285/82 |

FOREIGN PATENT DOCUMENTS

| | | |
|---|---|---|
| JP | 2000-130639 A | 5/2000 |
| JP | 3069098 U | 5/2000 |
| JP | A-2004-232679 | 8/2004 |
| JP | A-2006-70994 | 3/2006 |
| JP | A-2010-261468 | 11/2010 |

\* cited by examiner

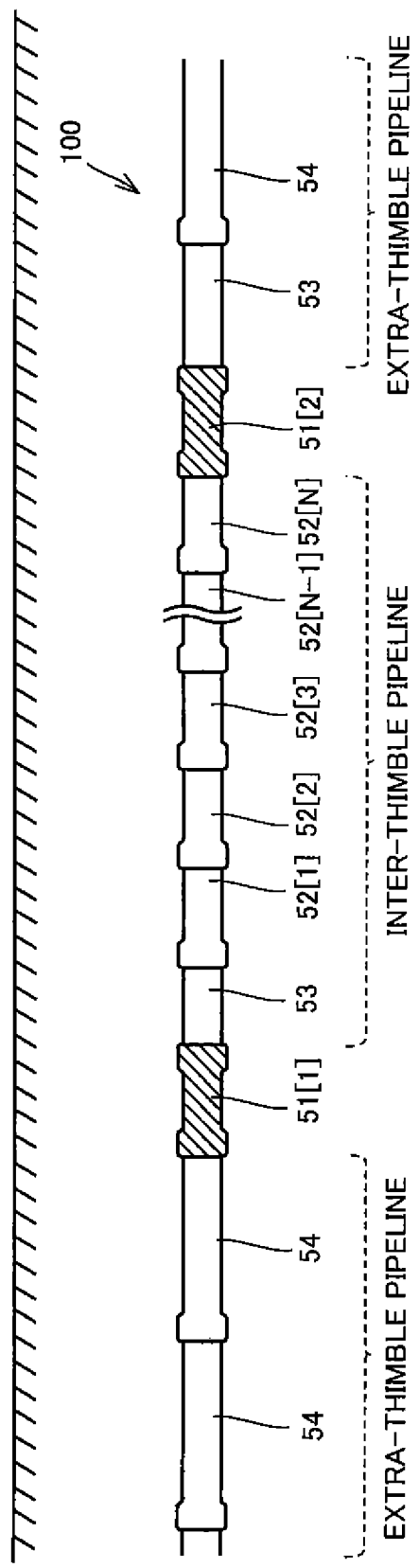

PIPELINE STRUCTURE AND COMPUTER READABLE RECORDING MEDIUM HAVING RECORDED THEREON PROGRAM FOR PIPELINE STRUCTURE

BACKGROUND OF THE INVENTION

Field of the Invention

The present disclosure relates to a pipeline structure of a buried pipeline and a program for designing the pipeline structure. Particularly, the present disclosure relates to the technique for achieving a pipeline structure that allows suppression of cracks, breakage and the like of a pipeline by following a large ground displacement (fault displacement) caused by the movement of a fault.

Description of the Background Art

Pipelines for supplying water, gas and the like are placed in various places. Each of these pipelines includes a plurality of pipes that are connected by joints. For example, Japanese Patent Laying-Open No. 2010-261468 and Japanese Patent Laying-Open No. 2004-232679 describe a so-called earthquake-resistant joint in which a joint portion extends/retracts and flexes to follow the movement of a ground caused by an earthquake and the like in order to maintain the function of a pipeline.

The pipeline is sometimes buried in a region having an active fault and the like where a large ground displacement is expected to occur. In the place having a fault, an amount of ground displacement is sometimes several meters due to the movement of the fault such as a normal fault, a reverse fault or strike slip. Therefore, it is impossible to obtain the extension/retraction and flexion functions that can deal with this large ground displacement, simply by using the conventional earthquake-resistant joint as described in the aforementioned patent documents, and it may become difficult that the pipeline functions as a lifeline. Thus, in order to allow the pipeline to deal with the large ground displacement, various techniques are under study. For example, Japanese Patent Laying-Open No. 2006-70994 describes a detachment preventive joint in which a joint that connects pipes has enhanced flexion function (bending capability).

SUMMARY OF THE INVENTION

As described in Japanese Patent Laying-Open No. 2006-70994, there are limitations to a bending angle at which the joint can flex. With regard to the limitations to the bending angle at which the joint can flex, Japanese Patent Laying-Open No. 2006-70994 describes as one example a joint in which one allowable bending angle is 1.5 degrees and a limit bending angle is 3.3 degrees. When a plurality of pipes each having a certain length are used and connected by joints to form a pipeline, there are certain limitations to a displacement that can be dealt with by the pipeline, because there are limitations to the bending angle at which the joint can flex. Therefore, it is not necessarily possible to deal with a large ground displacement.

Accordingly, there is a demand for the technique of allowing the pipeline to deal with a larger ground displacement, i.e., the technique of allowing the pipeline to maintain its function even when a larger displacement occurs at a ground having the pipeline buried therein. When a large fault displacement can occur, it is desirable that the pipeline can also follow this large displacement and maintain its required function as a lifeline.

The present disclosure has been made in view of the aforementioned problem and an object thereof is to provide a pipeline structure that allows a pipeline to deal with a large ground displacement caused by the movement of a fault, and a computer readable recording medium having recorded thereon a program for the pipeline structure for outputting pipeline structure data indicating the pipeline structure in order to support the design of the pipeline structure.

(1) According to one embodiment, there is provided a pipeline structure of a buried pipeline. The pipeline structure includes: at least two collars spaced apart from each other; and a plurality of pipes, the pipes being connected to one another by joints to provide the pipeline formed of the pipes. An inter-collar pipeline is formed of the pipes and opposing ends thereof are connected to the collars spaced apart from each other. An extra-collar pipeline is formed of the pipes and only one end thereof is connected to the collar. Comparing the inter collar pipeline and the extra collar pipeline of the same length, the number of the joints is larger in the inter-collar pipeline than in the extra-collar collar pipeline.

(2) According to one embodiment, in the pipeline structure according to (1), a pipe joint structure for connecting the pipes to each other has such a structure that a spigot formed at an end of the other pipe is inserted into a socket formed at an end of one pipe, and the socket and the spigot can relatively allow movement in a pipe axis direction and in a direction perpendicular to a pipe axis, and a collar joint structure for connecting the collar and the pipe has such a structure that a spigot of the pipe is inserted into an end of the collar, and the collar and the spigot can relatively allow movement in the pipe axis direction.

(3) According to one embodiment, in the pipeline structure according to (2), an amount of extension/retraction of the collar joint structure in the pipe axis direction is larger than an amount of extension/retraction of the pipe joint structure in the pipe axis direction.

(4) According to one embodiment, in the pipeline structure according to any one of (1) to (3), the pipes include a first pipe having a first length in a pipe axis direction and a second pipe having a second length shorter than the first length in the pipe axis direction, and at least one second pipe is included in the inter-collar pipeline.

(5) According to one embodiment, in the pipeline structure according to any one of (1) to (4), spigots are inserted from opposing ends of the collar in a pipe axis direction.

(6) According to one embodiment, in the pipeline structure according to (1), a collar joint structure for connecting the collar and the pipe has such a structure that a spigot of the pipe is inserted into an end of the collar, and the collar and the spigot can relatively allow movement in a pipe axis direction, the pipes include a first pipe having a first length in the pipe axis direction and a second pipe having a second length shorter than the first length in the pipe axis direction, and at least one second pipe is included in the inter-collar pipeline, and the pipe used in the collar joint structure is the second pipe.

(7) According to one embodiment, in the pipeline structure according to any one of (1) to (6), an inner diameter of a part of the collars in an axial direction is smaller than an outer diameter of a spigot of the pipe.

(8) According to one embodiment, in the pipeline structure according to any one of (1) to (7), the pipeline structure includes at least one B-type cut pipe having spigots at opposing ends thereof in a pipe axis direction.

(9) According to one embodiment, in the pipeline structure according to any one of (1) to (8), the pipeline includes a fitting. Examples of the fitting include a bend, a reducer, a tee and the like.

(10) According to one embodiment, in the pipeline structure according to (2), the pipeline structure is buried in a ground having a fault, and the pipeline structure includes the number of the pipe joint structures that can absorb an amount of expected ground displacement in the direction perpendicular to the pipe axis in a range where the pipeline structure is buried.

(11) According to one embodiment, in the pipeline structure according to any one of (1) to (10), the pipeline structure is buried in a ground having a fault, and the two collars are arranged at a position where the fault is sandwiched between the two collars.

(12) According to one embodiment, in the pipeline structure according to any one of (1) to (11), the pipeline structure is buried in a ground having a fault, and a plurality of fault-resistant pipeline structures each formed of the collars and the inter-collar pipeline are arranged continuously.

(13) According to one embodiment, there is provided a computer readable recording medium having recorded thereon a program for the pipeline structure for causing a computer to output pipeline structure data indicating the pipeline structure as recited in any one of (1) to (12). The computer includes a processor and a memory, and the memory is configured to store fault condition data indicating an amount of fault displacement and a fault intersection angle in a range where the pipeline is buried as well as displacement absorption amount data indicating an amount of displacement in a direction perpendicular to a pipe axis that can be absorbed by the pipe joint structure. The program for the pipeline structure causes the processor to perform the steps of: obtaining information about a distance between the two collars spaced apart from each other, in the range where the pipeline is buried; calculating perpendicular direction displacement data indicating an amount of ground displacement in the direction perpendicular to the pipe axis of the pipeline structure, based on the fault condition data in the range where the pipeline is buried; generating, by computation, number-of-joints information indicating the number of joints that can absorb the amount of ground displacement in the direction perpendicular to the pipe axis, based on the perpendicular direction displacement data and the displacement absorption amount data; and determining the pipeline structure based on the distance information and the number-of-joints information, and outputting pipeline structure data indicating the determined pipeline structure.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a side view of a pipeline routed according to one embodiment.

FIG. 2A is a view showing a state of dealing with a displacement in a pipe axis direction by using a joint portion 61.

FIG. 2B is a view showing a state of flexion of joint portion 61 (a state of dealing with a displacement in a direction perpendicular to a pipe axis).

DESCRIPTION OF THE PREFERRED EMBODIMENTS

Figure 2A:
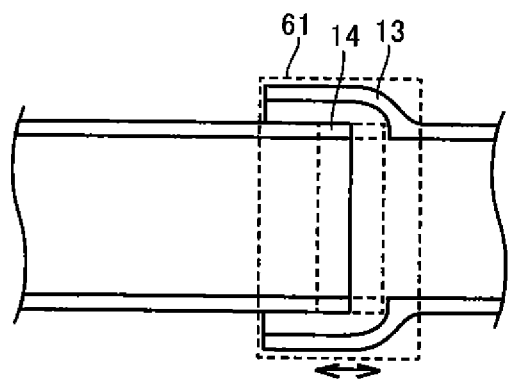
FIG. 2A and FIG. 2B are conceptual views each showing a configuration that deals with a displacement by using a joint.

A pipeline structure according to an embodiment of the present invention and processing of a program for designing the pipeline structure by a computer will be described hereinafter with reference to the drawings. In the following description, the same reference characters are assigned to the same components. Their names and functions are also the same. Therefore, detailed description about them will not be repeated.

In the following description, a pipeline for water supply will be described as an example.

<Overview of Pipeline Structure>

FIG. 1 is a side view of a pipeline routed according to one embodiment. Referring to FIG. 1, a pipeline structure of a pipeline 100 includes a collar 51, a plurality of short pipes 52 (short pipe 52[1] to short pipe 52[N]) and a B-type cut pipe 53. As shown in FIG. 1, in the pipeline structure, a plurality of short pipes 52 are arranged in an inner zone that is sandwiched between at least two collars 51 (collar 51[1] and collar 51[2]) spaced apart from each other, and a plurality of long pipes 54 are arranged outside the inner zone. The pipes such as B-type cut pipes 53, short pipes 52 and long pipes 54 are connected to one another by joints to provide a pipeline formed of the pipes. In the example shown in FIG. 1, a pipeline formed of the pipes and arranged between the collars (a pipeline formed of B-type cut pipe 53 and a plurality of short pipes 52) is represented as an inter-collar pipeline. Opposing ends of the inter-collar pipeline are connected to collar 51[1] and collar 51[2], respectively. A pipeline formed of the pipes and having one end thereof connected to collar 51 is represented as an extra-collar pipeline.

Each of opposing ends of collar 51 has a socket which accepts insertion of another pipe, which has a detachment preventive function and which makes connection with another pipe. Collar 51 has a connection structure in which the pipes can move in the pipe axis direction. Namely, collar 51 has the connection structure for following a displacement in the pipe axis direction. A collar having a diameter of, for example, approximately 1 to 2.5 m (but not limited thereto) can be used as collar 51. A collar having a length of, for example, approximately 1 to 3 m (but not limited thereto) can be used as collar 51, and as the length of collar 51 becomes longer, a larger amount of displacement in the pipe axis direction can be dealt with. Although the spacing between the collars depends on the situation of a zone where the pipeline is buried, it is desirable that the spacing between the collars is approximately 10 to 100 m in order to exhibit their function.

Long pipe 54 is a pipe having a spigot at one end thereof and a socket at the other end thereof. Long pipe 54 is connected to another pipe by a joint structure. Long pipe 54 has a length of approximately several meters such as, for example, 5 m as a first length in the pipe axis direction, and corresponds to a first pipe in the present application.

Short pipe 52 is a pipe having a spigot at one end thereof and a socket at the other end thereof. Short pipe 52 is connected to another pipe by a joint structure. Short pipe 52 is a pipe having a second length shorter than the first length (when the first length is approximately 5 m, the second length is, for example, approximately 1 to 3 m) in the pipe axis direction, and corresponds to a second pipe in the present application.

Figure 8:
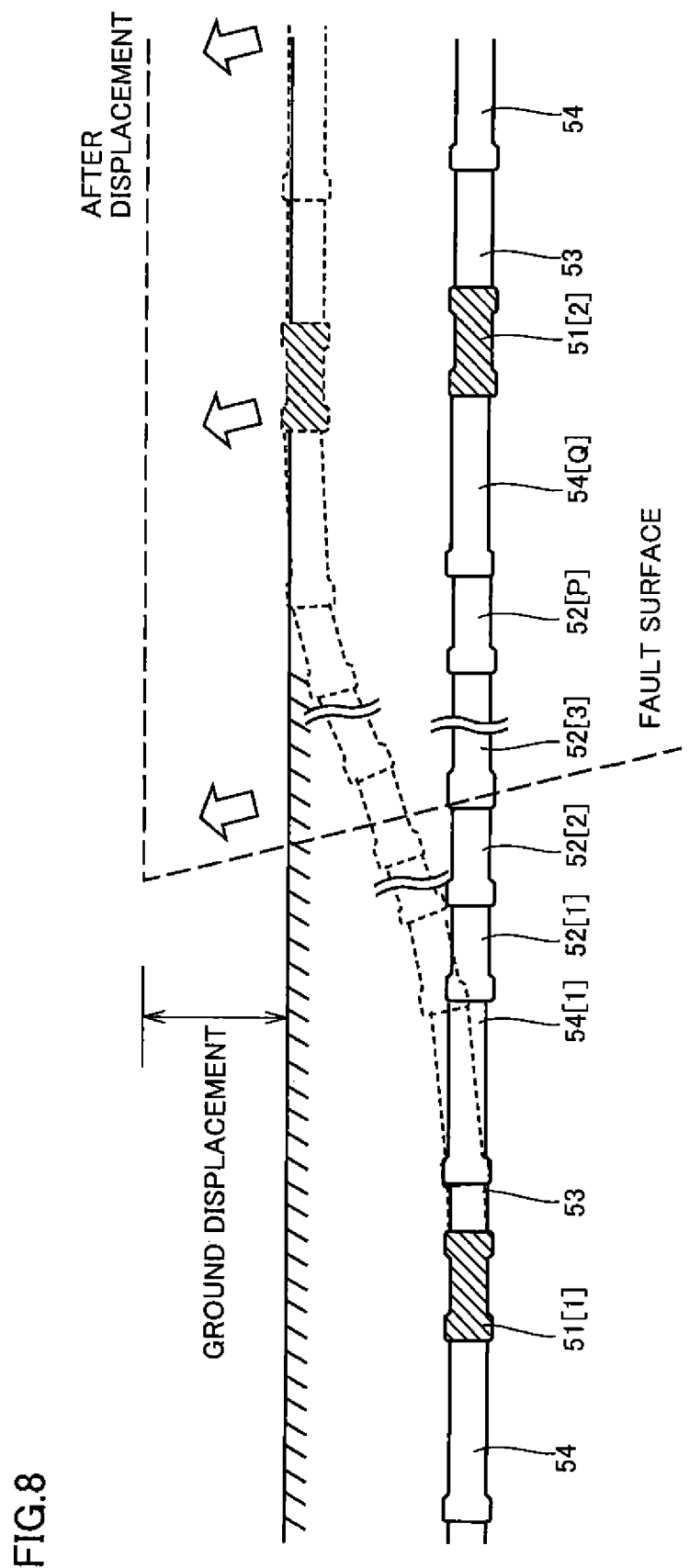
FIG. 8 is a view showing an amount of displacement that can be dealt with in accordance with a ground displacement, when at least one short pipe 52 is arranged between the collars and a plurality of pipes are connected by the joints.

B-type cut pipe 53 is a pipe having spigots at opposing ends thereof. As shown in FIG. 1, B-type cut pipe 53 is provided between the socket of collar 51 and the socket of short pipe 52, and connects collar 51 and short pipe 52 by a joint structure. In addition, as shown in FIG. 8, B-type cut pipe 53 is provided between the socket of collar 51 and the socket of long pipe 54, and connects collar 51 and long pipe 54 by a joint structure. B-type cut pipe 53 described above is generally obtained by cutting the socket portion of long pipe 54 to form a spigot, and is shorter than long pipe 54. Therefore, in this case, B-type cut pipe 53 is included in the second pipe in the present application.

A pipe joint structure that connects the pipes has an extension/retraction mechanism that allows the movement of the connected pipes within a certain range, a detachment preventive mechanism for preventing detachment of the connected pipes, and a water-tight mechanism for exhibiting water tightness. Due to the extension/retraction mechanism, the pipe joint structure can deal with a displacement in the pipe axis direction. Due to the extension/retraction mechanism, the pipe joint structure can also flex, and thus, can deal with a displacement in the direction perpendicular to the pipe axis. For example, an allowable bending angle and a limit bending angle indicate the flexion capability by the joint. Until the bending angle reaches the allowable bending angle, the pipeline can be flexed without any trouble due to the joint structure. However, when the bending angle exceeds the limit bending angle, the function as the joint is lost and water leakage occurs eventually.

Figure 2B:
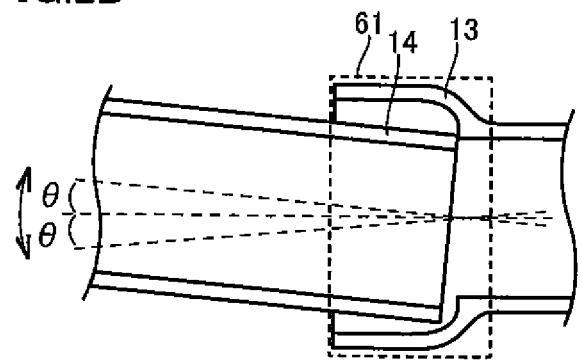

FIG. 2A and FIG. 2B are conceptual views each showing a configuration of the joint of the pipes that deals with a ground displacement. A spigot 14 of the other pipe is inserted into a socket 13 of one pipe, thereby achieving the extension/retraction mechanism, the detachment preventive mechanism and the water-tight mechanism. FIG. 2A is a view showing a state of dealing with a displacement in the pipe axis direction by using a joint portion 61. FIG. 2B is a view showing a state of flexion of joint portion 61 (a state of dealing with a displacement in the direction perpendicular to the pipe axis). Since FIG. 2A and FIG. 2B are conceptual views, the details are not shown.

When the pipes are mainly used in pipeline 100, an amount of displacement that can be dealt with by pipeline 100 (an amount of displacement in the pipe axis direction and an amount of displacement in the direction perpendicular to the pipe axis) is determined by the number of joints. Namely, assuming that the number of joints K (K is an integer) represents the number of joints when only long pipe 54 having the first length is arranged between two collars 51 (collar 51[1] and collar 51[2]) in pipeline 100, a displacement that can be dealt with by pipeline 100 can become larger by including at least one short pipe 52 having the second length shorter than the first length in pipeline 100, and setting the number of joints to be equal to or larger than the number of joints (K+1). Even when a massive displacement occurs at a fault, it is possible to enhance the possibility that the pipeline can follow the displacement without being broken. Namely, by increasing the number of joints included in pipeline 100, an amount of flexion per joint can be reduced and a bending stress generated at the joint and the pipe body can be reduced. Therefore, even when a large displacement occurs at a ground, the stress in the direction perpendicular to the pipe axis (in the flexion direction) that remains in each joint can be reduced and the possibility of breaking of the pipeline can be reduced.

Pipeline 100 is buried in a ground having a fault. In the example shown in FIG. 1, two collars 51 (collar 51[1] and collar 51[2]) are arranged to sandwich a zone where a fault displacement is expected to occur. Normally, when the pipes each having a long length in the pipe axis direction are used, the number of buried pipes can be reduced and the number of joint connection spots can be reduced. Therefore, when the pipeline is formed in a section having a certain distance, the pipes each having a long length in the pipe axis direction are used, and thereby, pipeline 100 can be efficiently buried. However, when a large fault displacement is expected to occur at the ground having pipeline 100 buried therein, pipeline 100 needs to include the number of joints that makes it possible to exhibit an amount of extensibility/retractability in the pipe axis direction and the flexion capability in the direction perpendicular to the pipe axis, such that an amount of ground displacement can be dealt with. Therefore, long pipes 54 are arranged outside the zone where a fault displacement is expected to occur, and in the zone where a fault displacement is expected to occur, two collars 51 are arranged to sandwich this zone and short pipes 52 are arranged between collars 51, thereby increasing the number of joints between collars 51.

Figure 3:
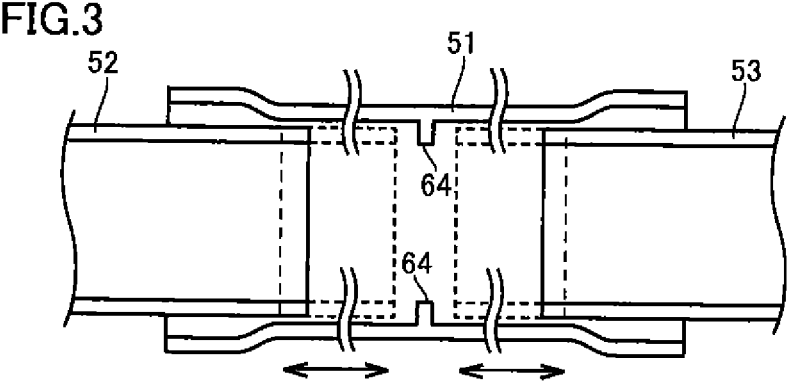
FIG. 3 is a conceptual view showing a configuration that can deal with the displacement in the pipe axis direction by using a collar 51.

FIG. 3 is a conceptual view showing a configuration of collar 51 that deals with a ground displacement in the pipe axis direction. Collar 51 has a length of, for example, approximately 2 m in the pipe axis direction, and has, on an inner portion thereof, a protruding portion (projection portion) 64 having an inner diameter smaller than an outer diameter of the spigot of the pipe. By protruding portion 64 provided on the inner portion, collar 51 restricts an amount of push-in, in the pipe axis direction, of the pipe inserted into collar 51. As compared with the pipe, collar 51 can deal with a larger amount of displacement in the pipe axis direction (has a larger amount of extensibility/retractability). Namely, collar 51 has a higher capability (extension/retraction capability) of dealing with a ground displacement in the pipe axis direction than that of the pipe. For example, comparing the extension/retraction capability of collar 51 and the extension/retraction capability of the pipe, the former can be set to be approximately ten times as high as the latter. Therefore, by using collar 51 in the pipeline, the pipeline can deal with (follow) a larger amount of ground displacement in the pipe axis direction without losing the original function of the pipeline. In other words, an amount of ground displacement in the pipe axis direction that can be dealt with (followed or absorbed) by the pipeline can be significantly increased, and the stress generated at the pipeline when a large fault displacement occurs at the ground can be reduced. Therefore, the possibility of breaking of the pipeline can be reduced.

As compared with the joint structure of the pipes, a joint structure of collar 51 can deal with a smaller amount of displacement in the direction perpendicular to the pipe axis (has a smaller amount of flexibility) (has a lower flexion capability). Thus, in the first embodiment, collar 51 and the pipes are combined and the pipes are connected by the aforementioned joint structure, thereby enhancing the flexion capability and the extension/retraction capability of pipeline 100. Therefore, a large fault displacement can be dealt with (followed or absorbed) within the range between two collars 51, and the possibility of maintaining the function as a lifeline after a large ground displacement occurs is enhanced.

<Joint Structure and Structure of Collar>

The detailed structure of the joint and the detailed structure of collar 51 will be described with reference to FIGS. 4 and 5.

Figure 4:
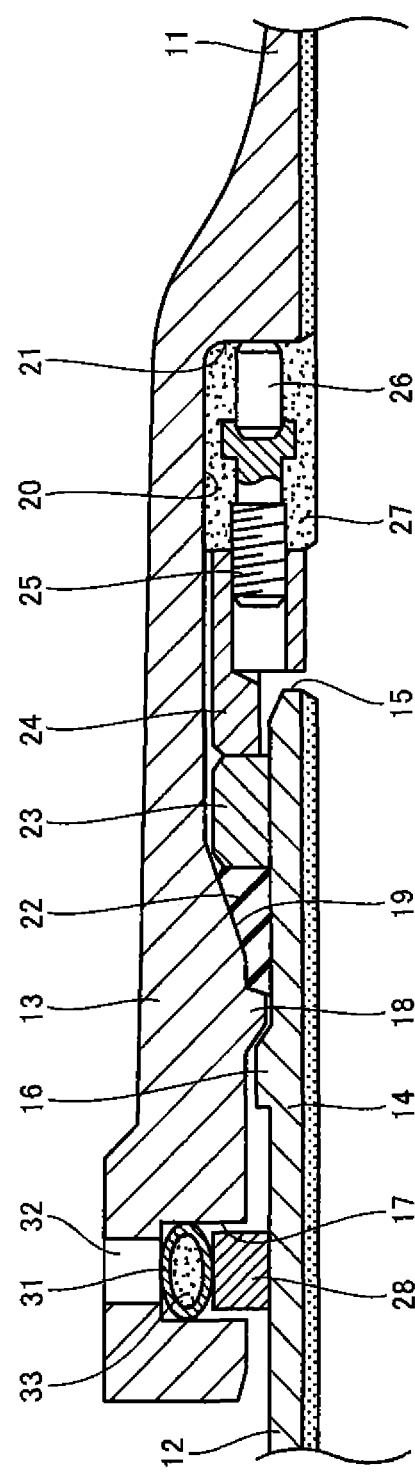
FIG. 4 is a view showing a structure of a joint that connects pipes.

FIG. 4 is a view showing one example of the joint structure that connects the pipes. As shown in FIG. 4, in this joint structure, spigot 14 of one pipe 12 is inserted into socket 13 of the other pipe 11 to connect one pipe 12 and the other pipe 11.

An outer circumferential protruding portion 16 is formed on an outer surface of spigot 14 and at a distance in the pipe axis direction from a tip end surface 15 which is a tip end surface of spigot 14. Outer circumferential protruding portion 16 is formed by, for example, welding an annular body on an outer circumference of spigot 14.

Socket 13 is provided with a lock ring accommodating groove 17 having a rectangular horizontal cross-sectional shape. As shown in FIG. 4, lock ring accommodating groove 17 is formed at a position closer to the opening side of socket 13 than outer circumferential protruding portion 16 when spigot 14 is inserted to reach a prescribed position inside socket 13. Socket 13 is also provided with an annular protruding portion 18. Annular protruding portion 18 is formed at a position closer to the back side than outer circumferential protruding portion 16 when spigot 14 is inserted to reach the prescribed position inside socket 13, and can engage with outer circumferential protruding portion 16. Socket 13 is also provided with a sealing material pressing surface 19. Sealing material pressing surface 19 is formed on an inner circumference of socket 13 and at a position closer to the back side than annular protruding portion 18. Sealing material pressing surface 19 has a tapered shape having a diameter that gradually increases toward the back side of socket 13. Socket 13 is also provided with an inner circumferential surface 20. Inner circumferential surface 20 is formed in a range closer to the back side than sealing material pressing surface 19 and in a certain range along the pipe axis direction on the inner circumference of socket 13. In addition, a back end surface 21 is formed on the back side inside socket 13.

A sealing material 22 is an annular member made of rubber and is arranged between sealing material pressing surface 19 and an outer circumferential surface of spigot 14.

At a position closer to the back side than sealing material 22 on the inner circumference of socket 13, a split ring 23 is arranged between the inner circumference of socket 13 and the outer circumference of spigot 14. A push ring 24 is arranged at a position closer to the back side of socket 13 than split ring 23. A plurality of bolts 25 are arranged along the circumferential direction of push ring 24 from an end surface of push ring 24 that forms the back side of socket 13. Push ring 24 is configured such that bolts 25 can be unscrewed. A joint rod 26 is connected to a tip end portion of bolt 25 and presses back end surface 21 of socket 13 as bolt 25 is unscrewed from push ring 24. Reactive force generated by this pressing compresses sealing material 22 via split ring 23, and thereby, the water tightness between the inner circumference of socket 13 and spigot 14 is ensured. In order to reduce the resistance caused by passage of water through the pipes, a mortar material 27 is filled around bolts 25 and joint rods 26. Mortar material 27 is formed to be cured to be flush with an inner surface of pipe 11.

An annular lock ring 28 is accommodated in lock ring accommodating groove 17. A resin tube 31 is arranged along the circumferential direction of the pipe between an outer circumferential surface of lock ring 28 and lock ring accommodating groove 17. An end of resin tube 31 is guided through a through hole 32 to the outside of the pipe. Through hole 32 is formed from the outer surface of socket 13 toward lock ring accommodating groove 17 in the radial direction of the pipe. When spigot 14 is inserted into socket 13 and outer circumferential protruding portion 16 is inserted to reach the position closer to the back side of socket 13 than lock ring 28, mortar 33 is filled into resin tube 31 and cured. As a result, resin tube 31 expands and inwardly presses lock ring 28 in the radial direction of the pipe, and thus, lock ring 28 can be fitted onto the outer surface of spigot 14.

With such a configuration, within a range where outer circumferential protruding portion 16 comes into contact with annular protruding portion 18 and lock ring 28, spigot 14 can be freely pulled out from and inserted into socket 13. As a result, the extension/retraction mechanism and the detachment preventive mechanism of the joint are achieved.

Figure 5:
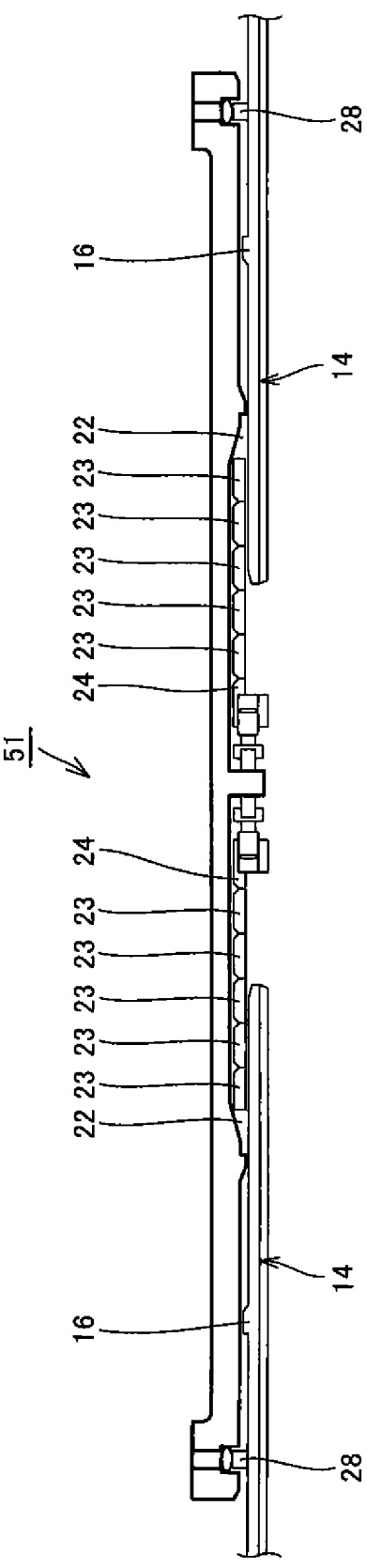
FIG. 5 is a view showing a structure of collar 51.

FIG. 5 is a view showing the structure of collar 51. Collar 51 has sockets at opposing ends thereof, and the structure of the socket is schematically common to that of socket 13 described with reference to FIG. 4. However, as compared with the pipe, a joint portion of the socket is extended largely in the pipe axis direction to include the larger number of split rings 23. As a result, the extension/retraction capability (amount of extensibility/retractability) in the pipe axis direction is significantly increased, i.e., significantly enhanced as compared with the pipe.

<Comparison of Amount of Displacement that can be Dealt with (Absorbed) by Pipeline>

For comparison, the fact that an amount of displacement that can be dealt with (absorbed) by the pipeline varies depending on the number of joints will be described with reference to FIGS. 6 to 8. Based on parameters such as a range where a fault occurs, ground characteristics such as a ground reaction coefficient, an amount of fault displacement, and a fault intersection angle, two collars are buried with a certain distance S therebetween, and a plurality of pipes are connected between these collars.

Figure 6:
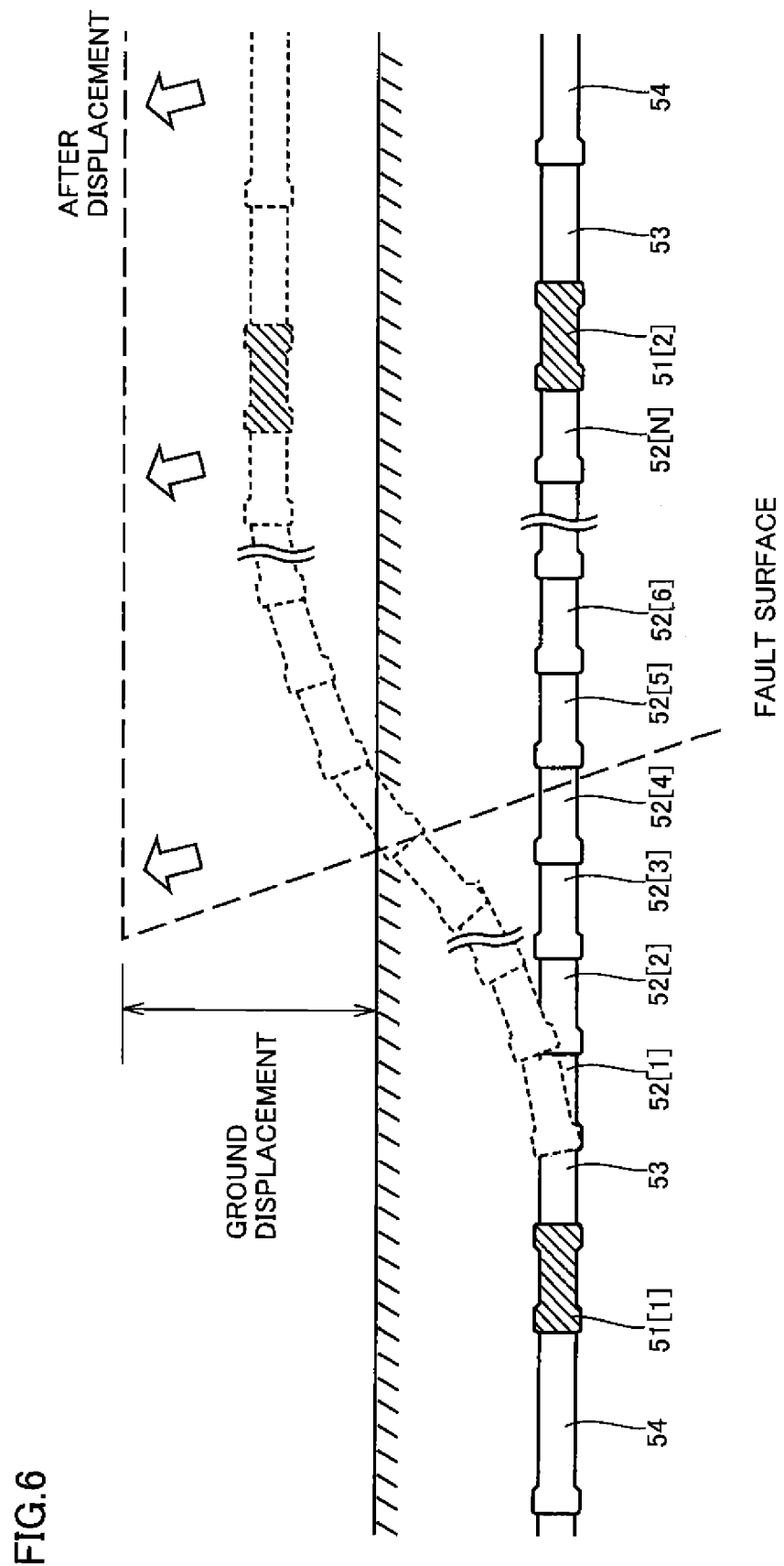
FIG. 6 is a view showing an amount of displacement that can be dealt with in accordance with a ground displacement, when a long pipe 54 is not arranged and a plurality of short pipes 52 are arranged between the collars.

FIG. 6 is a view showing an amount of displacement that can be dealt with (absorbed) in accordance with a ground displacement, when long pipe 54 is not arranged and a plurality of short pipes 52 are arranged between the collars.

Except that B-type cut pipe 53 is connected to collar 51[1], short pipes 52 are arranged between collar 51[1] and collar 51[2].

Figure 7:
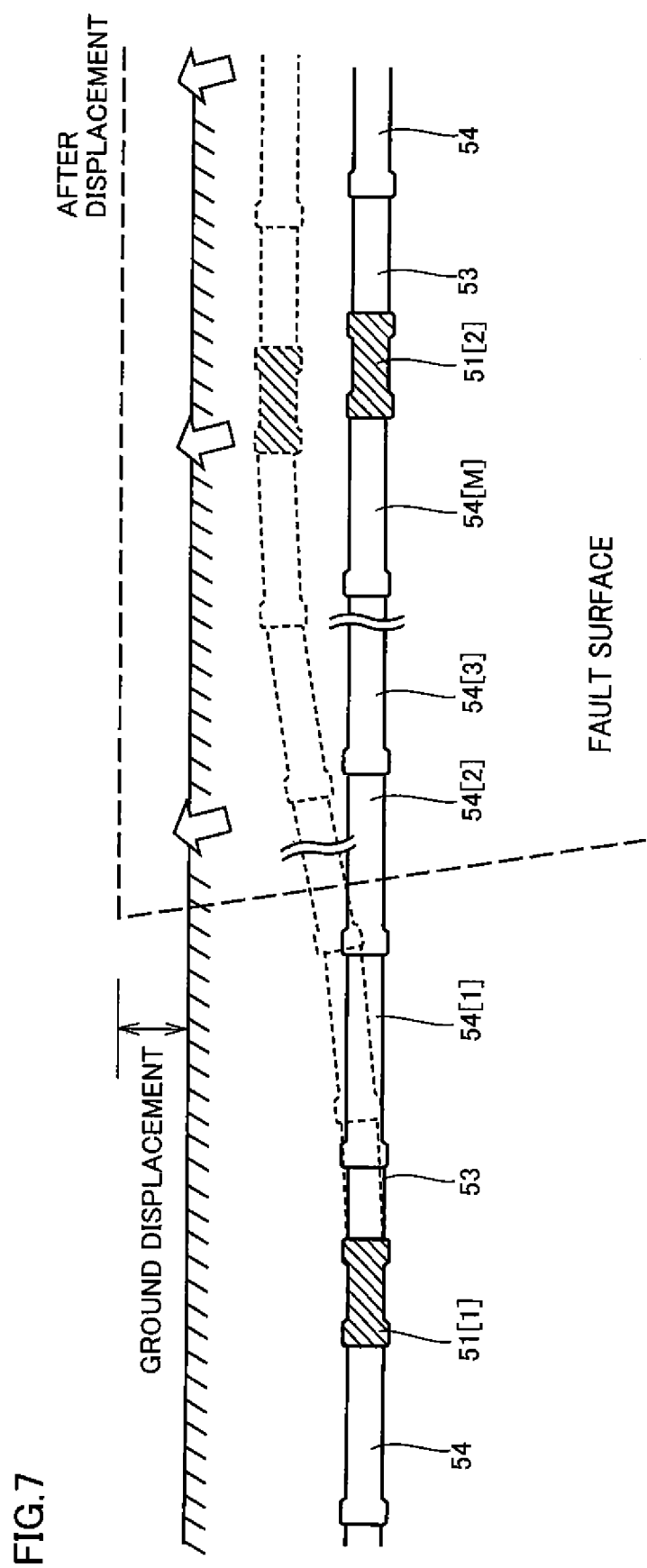
FIG. 7 is a view showing an amount of displacement that can be dealt with in accordance with a ground displacement, when short pipe 52 is not arranged and a plurality of long pipes 54 are arranged between the collars.

FIG. 7 is a view showing an amount of displacement that can be dealt with (absorbed) in accordance with a ground displacement, when short pipe 52 is not arranged and a plurality of long pipes 54 are arranged between the collars. Except that B-type cut pipe 53 is connected to collar 51[1], long pipes 54 are arranged between collar 51[1] and collar 51[2].

FIG. 8 is a view showing an amount of displacement that can be dealt with (absorbed) in accordance with a ground displacement, when at least one short pipe 52 is arranged between the collars and a plurality of pipes are connected by the joints.

FIGS. 6 to 8 will be compared. Then, in the case in which long pipe 54 is not arranged and the plurality of short pipes 52 are arranged between the collars as shown in FIG. 6, the number of joints can be increased, as compared with the case in which short pipe 52 is not arranged and the plurality of long pipes 54 are arranged between the collars as shown in FIG. 7. Therefore, by increasing the number of joints, it is possible to increase the amount of displacement in the pipe axis direction that can be dealt with (absorbed) by the pipeline (amount of extensibility/retractability) and the amount of displacement in the direction perpendicular to the pipe axis that can be dealt with (absorbed) by the pipeline (amount of flexibility).

In addition, in the case in which short pipe 52 is included between the collars as shown in FIG. 8, pipeline 100 including the larger number of joints between the collars can be formed, as compared with the case shown in FIG. 7, and it is possible to increase the amount of ground displacement that can be dealt with (absorbed) by the pipeline.

Now, comparison will be made, for example, between an amount of ground displacement that can be dealt with (absorbed) by the pipeline in the case (1) in which three pipes each having a length in the pipe axis direction of 5 m are arranged as long pipes 54 between the collars and an amount of ground displacement that can be dealt with (absorbed) by the pipeline in the case (2) in which five pipes each having a length in the pipe axis direction of 3 m are arranged as short pipes 52 between the collars.

It is assumed that the extension/retraction capability (amount of extensibility/retractability) of the joint in the pipe axis direction is extension/retraction capability $1=\pm 60$ mm, and the allowable bending angle of the joint is allowable bending angle $\theta=4°$. It is also assumed that an amount of flexion of collar 51 is negligible as compared with an amount of flexion by the joint.

In the case (1) in which three pipes each having a length of 5 m are used, the amount of displacement in the pipe axis direction by the joint is as follows:

the amount of displacement in the pipe axis direction=three pipes×extension/retraction capability $1=\pm 180$ mm.

The amount of displacement in the direction perpendicular to the pipe axis by the joint is as follows:

the amount of displacement in the direction perpendicular to the pipe axis=5000 mm×sin θ+5000 mm×sin 2θ+5000 mm×sin θ=1390 mm.

Here, it is assumed that the first pipe flexes at an angle θ with respect to the pipe axis direction of the collar, the second pipe connected to the first pipe flexes at angle θ with respect to the pipe axis direction of the first pipe (angle 2θ with respect to the pipe axis direction of the collar), and the third pipe connected to the second pipe flexes at an angle −θ with respect to the second pipe.

In the case (2) in which five pipes each having a length of 3 m are used, the amount of displacement in the pipe axis direction by the joint is as follows:

the amount of displacement in the pipe axis direction=five pipes×extension/retraction capability $1=\pm 300$ mm.

The amount of displacement in the direction perpendicular to the pipe axis by the joint is as follows:

the amount of displacement in the direction perpendicular to the pipe axis=3000 mm×sin θ+3000 mm×sin 2θ+3000 mm×sin 3θ+3000 mm×sin 2θ+3000 mm×sin θ=3000 mm×(2 sin θ+2 sin 2θ+sin 3θ)=1880 mm.

The case (1) and the case (2) will be compared. By using short pipes 52 between the collars instead of long pipes 54, the number of joints that connect the pipes is increased. As a result, the amount of displacement in the pipe axis direction and the amount of displacement in the direction perpendicular to the pipe axis are both increased.

Specific description will be given to the fact that arranging collars 51 in the pipeline results in a significant increase in amount of displacement in the pipe axis direction. For example, it is assumed that a ground displacement of 1500 mm in the pipe axis direction is expected to occur. It is assumed that the extension/retraction capability of the joint is extension/retraction capability $1=\pm 60$ mm and the extension/retraction capability of collar 51 is extension/retraction capability $L=\pm 600$ mm which is ten times as high as that of the pipe. In order to deal with the ground displacement of 1500 mm in the pipe axis direction by using the joints, the joints are needed at 25 locations (1500 mm/60 mm). However, when two collars are arranged in the zone where the fault displacement is expected to occur, the joints may only be needed at at least five locations ((1500 mm−2 L)/60 mm) in order to deal with the ground displacement of 1500 mm in the pipe axis direction.

<Operation of Computer for Determining Pipeline Structure Based on Fault Displacement Data and the Like>

A computer program (program for the pipeline structure) for supporting the design can be used to design the pipeline structure described in the embodiment. The program is read by a processor in a computer system such as PC (Personal Computer). Based on data such as an amount of fault displacement, the processor performs a certain operation in accordance with the program, and outputs pipeline structure data.

Figure 9:
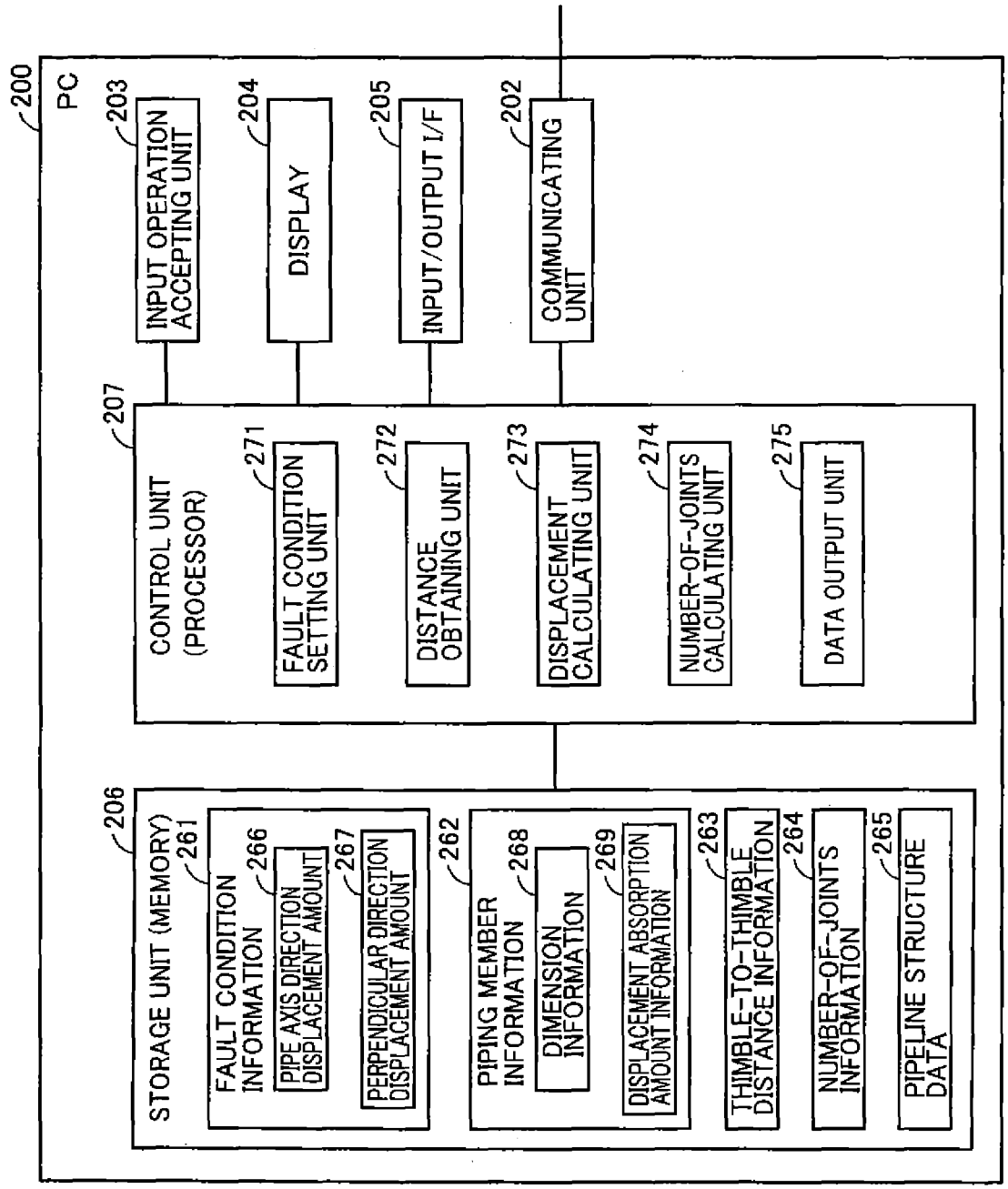
FIG. 9 is a block diagram showing a configuration of a PC (Personal Computer) as one example of a computer system.

FIG. 9 is a block diagram showing a configuration of the PC as one example of the computer system. As shown in FIG. 9, a PC 200 includes a communicating unit 202, an input operation accepting unit 203, a display 204, an input/output I/F 205, a storage unit 206, and a control unit 207.

Communicating unit 202 is a communication interface for performing modulation/demodulation processing and the like such that PC 200 communicates with other communication devices to transmit and receive signals. Communicating unit 202 communicates with other communication devices by wire or wireless communication. For example, when PC 200 communicates with other communication devices by wireless communication, communicating unit 202 is a communication module for wireless communication including a tuner, a high-frequency circuit and the like, and performs modulation/demodulation and frequency conversion of wireless signals transmitted and received by PC 200, and provides the received signals to control unit 207.

Input operation accepting unit 203 is a member for accepting an input operation by a user of PC 200 (e.g., a designer of the pipeline structure). Input operation accepting unit 203 is implemented by various types of input devices such as, for example, a keyboard, a trackpad and a touch panel.

By execution of the program in PC 200, display 204 displays a user interface and the like such as a menu screen. Display 204 is implemented by, for example, LCD (Liquid Crystal Display). However, display 204 is not limited thereto and may be implemented by other display devices such as an organic EL (electroluminescence) display.

Input/output I/F 205 is a general-purpose interface for connecting PC 200 and various types of devices. For example, input/output I/F 205 accepts attachment of a storage device such as a memory card and outputs data of the storage device to control unit 207.

Storage unit 206 is configured by a flash memory, RAM (Random Access Memory) or the like and stores the data and the program (e.g., the program for the pipeline structure) used by PC 200. In an aspect, storage unit 206 stores fault condition information 261, piping member information 262, collar-to-collar distance information 263, number-of-joints information 264, and pipeline structure data 265.

Fault condition information 261 is information about a fault in a zone where the pipeline is buried. For example, fault condition information 261 includes information indicating a range where the fault occurs, information indicating ground characteristics such as a ground reaction coefficient, information indicating an amount of fault displacement, and information indicating a fault intersection angle. Fault condition information 261 also includes a pipe axis direction displacement amount 266 indicating an amount of ground displacement in the pipe axis direction that is expected to occur at the pipeline, and a perpendicular direction displacement amount 267 indicating an amount of ground displacement in the direction perpendicular to the pipe axis that is expected to occur at the pipeline. These pipe axis direction displacement amount 266 and perpendicular direction displacement amount 267 are calculated by PC 200 based on each fault condition.

Piping member information 262 indicates information about the piping members such as the collars and the pipes included in the pipeline. For example, piping member information 262 includes dimension information 268 indicating various dimensions such as a length of each piping member in the pipe axis direction and a pipe diameter, and displacement amount information 269 indicating the capability of each piping member dealing with a ground displacement, such as the extension/retraction capability of the collar and the extension/retraction capability of the joint.

Collar-to-collar distance information 263 indicates a distance (span S) between two collars 51 arranged in the pipeline to deal with a displacement in the pipe axis direction.

Number-of-joints information 264 indicates the number of joints for a plurality of pipes arranged between two collars 51.

Pipeline structure data 265 is data indicating the structure of the pipeline.

Control unit 207 reads and executes a control program stored in storage unit 206, thereby controlling the operation of PC 200. Control unit 207 is, for example, an application processor. Control unit 207 operates in accordance with the program, thereby exhibiting the respective functions of a fault condition setting unit 271, a distance obtaining unit 272, a displacement calculating unit 273, a number-of-joints calculating unit 274, and a data output unit 275.

When the pipeline is placed in a zone where a fault occurs, fault condition setting unit 271 obtains information about the fault in response to the input operation by an external communication device or the user, and causes storage unit 206 to store the information as fault condition information 261.

Based on fault condition information 261 and piping member information 262, distance obtaining unit 272 obtains, by computation, collar-to-collar distance information 263 indicating a distance between two collars 51.

Based on the information about the fault stored in storage unit 206, displacement calculating unit 273 calculates pipe axis direction displacement amount 266 and perpendicular direction displacement amount 267.

Based on the distance (span S) indicated by collar-to-collar distance information 263, perpendicular direction displacement amount 267 and pipe axis direction displacement amount 266, number-of-joints calculating unit 274 determines the number of joints and generates number-of-joints information 264.

Based on collar-to-collar distance information 263 and number-of-joints information 264, data output unit 275 outputs pipeline structure data 265.

Figure 10:
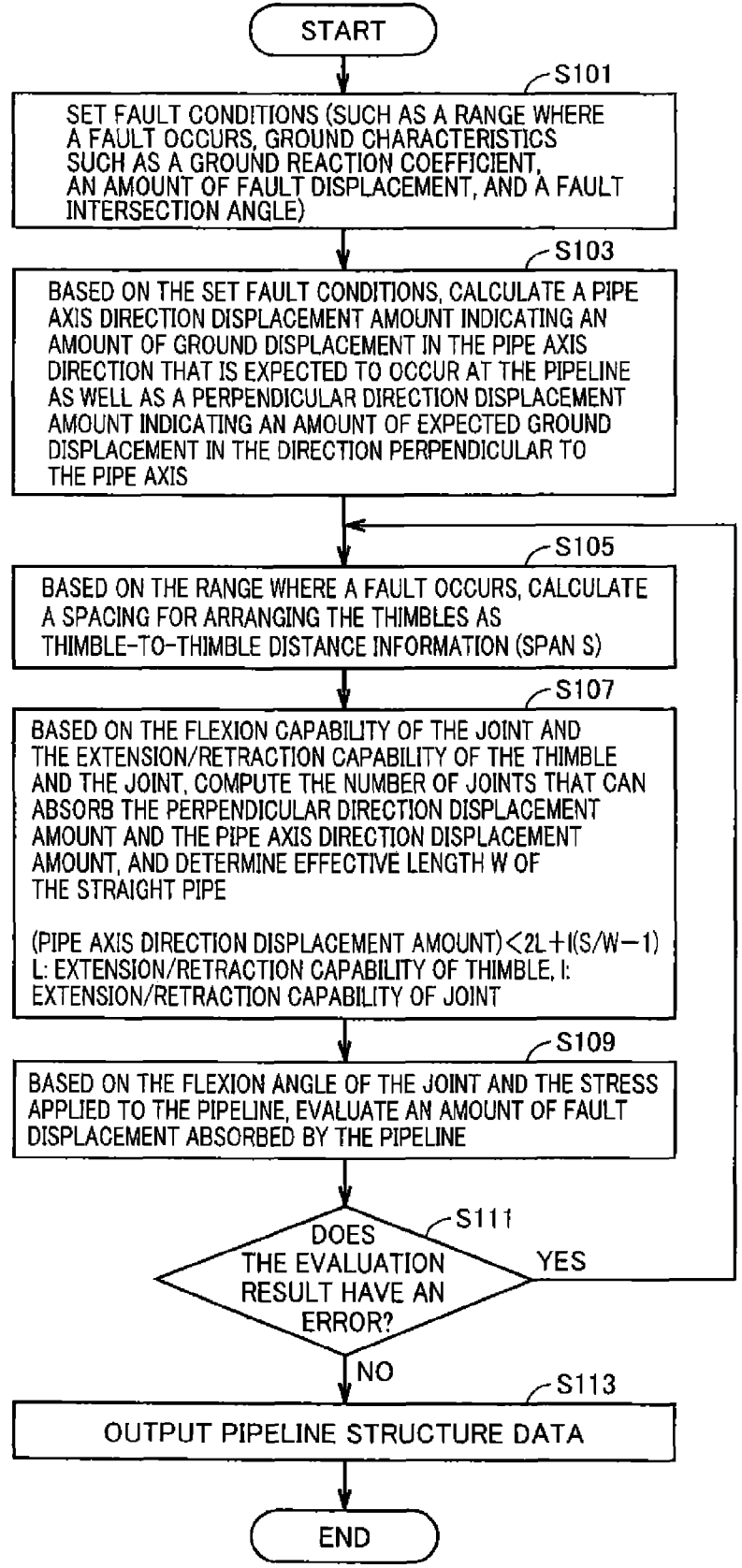
FIG. 10 is a flowchart showing processing, by a control unit 207, for outputting pipeline structure data 265 in accordance with a program.

FIG. 10 is a flowchart showing processing, by control unit 207, for outputting pipeline structure data 265 in accordance with the program.

In step S101, control unit 207 sets various types of information indicating the fault conditions in storage unit 206 as fault condition information 261.

In step S103, based on the data indicating various fault conditions included in fault condition information 261, control unit 207 calculates, as pipe axis direction displacement amount 266, the amount of ground displacement in the pipe axis direction that is expected to occur at the pipeline, and calculates, as perpendicular direction displacement amount 267, the amount of ground displacement in the direction perpendicular to the pipe axis that is expected to occur at the pipeline.

In step S105, based on fault condition information 261, control unit 207 calculates, as collar-to-collar distance information 263, the distance (span S) between collars 51 to sandwich the range where the fault occurs.

In step S107, based on the flexion capability of the joint, the extension/retraction capability of collar 51 and the extension/retraction capability of the joint indicated by piping member information 262, control unit 207 generates, by computation, the number of joints that can deal with perpendicular direction displacement amount 267 and pipe axis direction displacement amount 266 as number-of-joints information 264. Based on collar-to-collar distance information 263 and number-of-joints information 264, control unit 207 determines an effective length W of the pipe. For example, assuming that the extension/retraction capability of collar 51 is extension/retraction capability L and the extension/retraction capability of the joint is extension/retraction capability 1, it is desirable to satisfy the relationship of (pipe axis direction displacement amount 266)<2 L+1(S/W−1). As a result, the pipeline can deal with the amount of displacement in the pipe axis direction that is expected to occur.

In step S109, control unit 207 determines the pipeline including a plurality of pipes based on effective length W of the pipe, and evaluates how much fault displacement can be dealt with by the determined pipeline, based on information such as a flexion angle of the joint and a stress applied to the pipeline due to the ground displacement.

In step S111, if an error is output in the processing of step S109 (YES in step S111), the processing proceeds to step S105. If not (NO in step S111), control unit 207 executes the processing of step S113.

In step S113, control unit 207 outputs the pipeline structure data indicating the pipeline determined in step S109 to the external communication device such as, for example, storage unit 206 or PC 200.

<Conclusion>

Although the pipeline structure and the program according to one embodiment have been described above, the pipeline structure and the program may be configured as described below.

(1) The example shown in FIG. 4 has been described as the structure of the joint. However, in addition to this, the pipes may be connected by joint structures shown in FIGS. 11 and 12.

Figure 11:
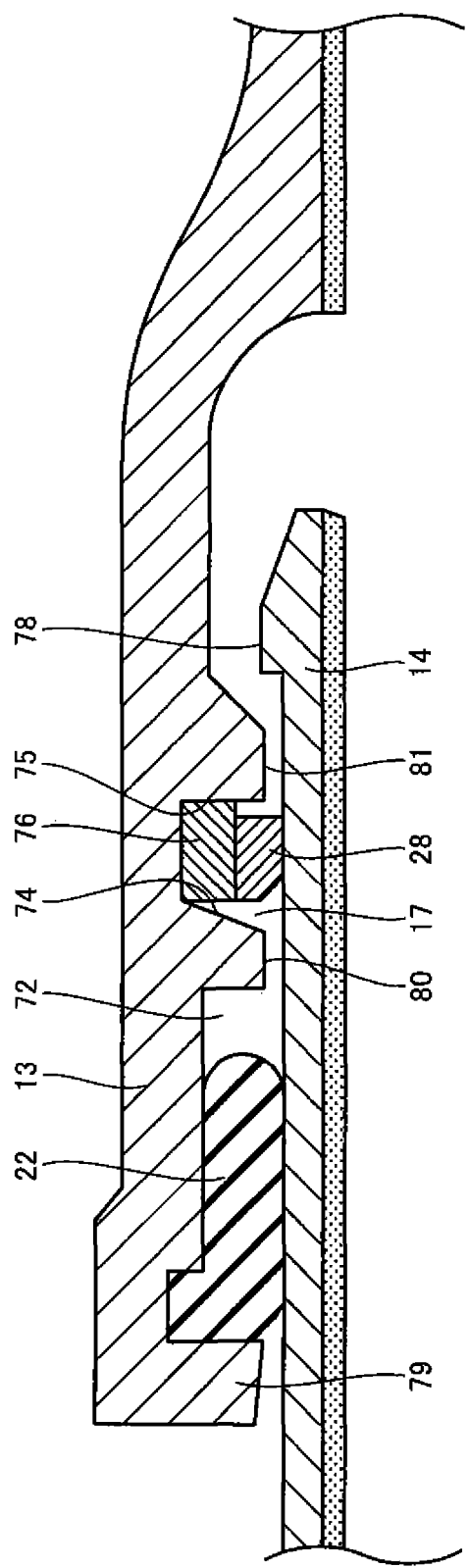
FIG. 11 is a view showing an example of a joint applied to a small-diameter pipe.

FIG. 11 is a view showing an example of a joint applied to a small-diameter pipe. As shown in FIG. 11, socket 13 is provided with an inner circumferential surface 74, a back side side surface 75, a socket back side protruding portion 81, an inter-accommodating groove protruding portion 80, and a socket opening end protruding portion 79, and spigot 14 is provided with a spigot protruding portion 78. The joint structure includes sealing material 22, lock ring 28 and a lock ring centering member 76, and thus, exhibits various functions such as the extension/retraction function.

Figure 12:
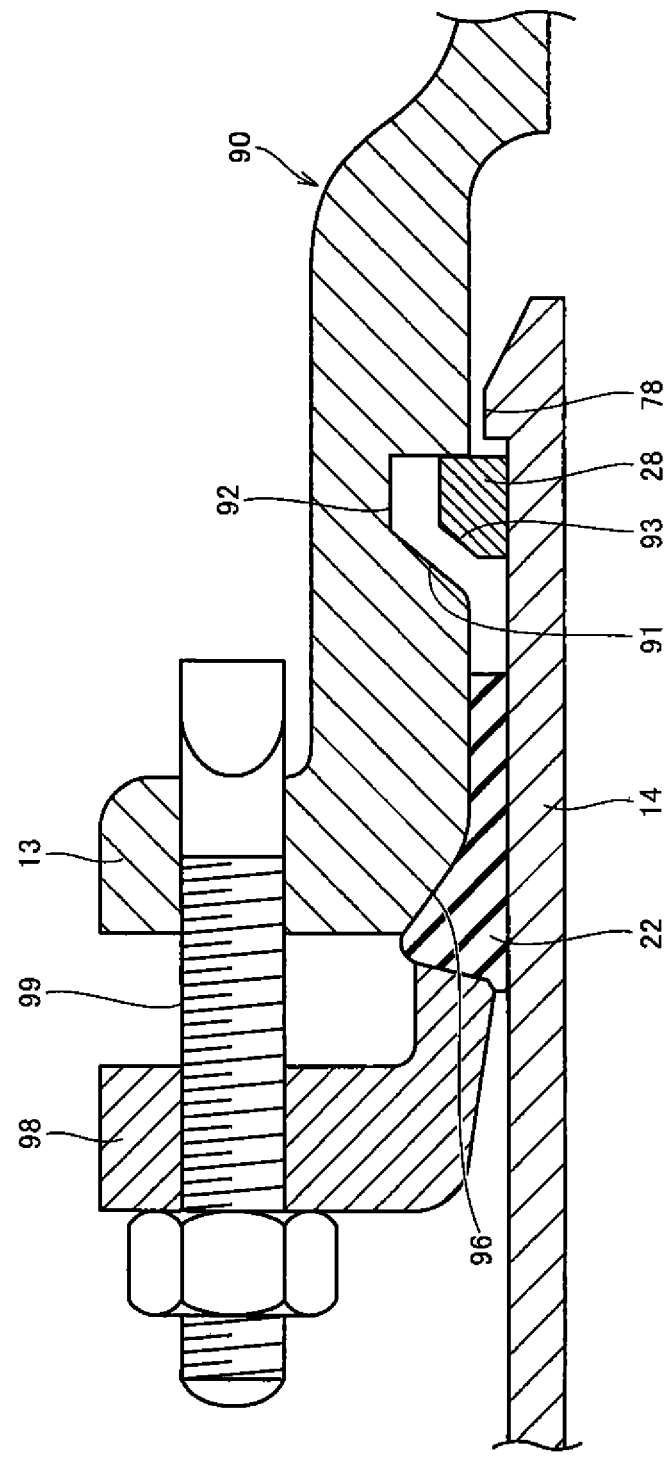
FIG. 12 is a view showing an example of a joint applied to a large-diameter pipe.

FIG. 12 is a view showing an example of a joint applied to a large-diameter pipe. As shown in FIG. 12, in a pipe joint 90, socket 13 is provided with a side surface 91 and a circumferential groove 92 on the socket opening side, and spigot 14 is provided with spigot protruding portion 78. Pipe joint 90 includes an enlarged-diameter portion 96, a push ring 98, a fastening bolt 99, sealing material 22, and lock ring 28, and lock ring 28 is provided with a tapered surface 93, and thus, pipe joint 90 exhibits various functions such as the extension/retraction function.

(2) In the embodiment, collar 51 has been used as the collar. However, a collar having an overall length that is nearly equal to that of the pipe may be used. When collar 51 is used, the extension/retraction capability in the pipe axis direction can be significantly enhanced. In addition, description has been given to the example in which the extension/retraction capability of collar 51 is approximately ten times as high as that of the joint. However, the extension/retraction capability of collar 51 is not limited to ten times. By using collar 51 having the extension/retraction capability higher than that of the joint, e.g., five times as high as that of the joint, the amount of displacement of the pipeline in the pipe axis direction can be significantly increased.

(3) In the embodiment, two collars 51 are used such that two collars 51 are located at opposing ends of the zone where a fault displacement is expected to occur. However, the number of collars 51 is not limited to two, and three or more collars 51 may be used. As a result, the extension/retraction capability in the pipe axis direction can be easily enhanced, and a fault zone having a very large width and the like can also be dealt with. For example, as shown in FIGS. 13 and 14, four collars 51 may be used in a zone where a fault displacement is expected to occur.

Figure 13:
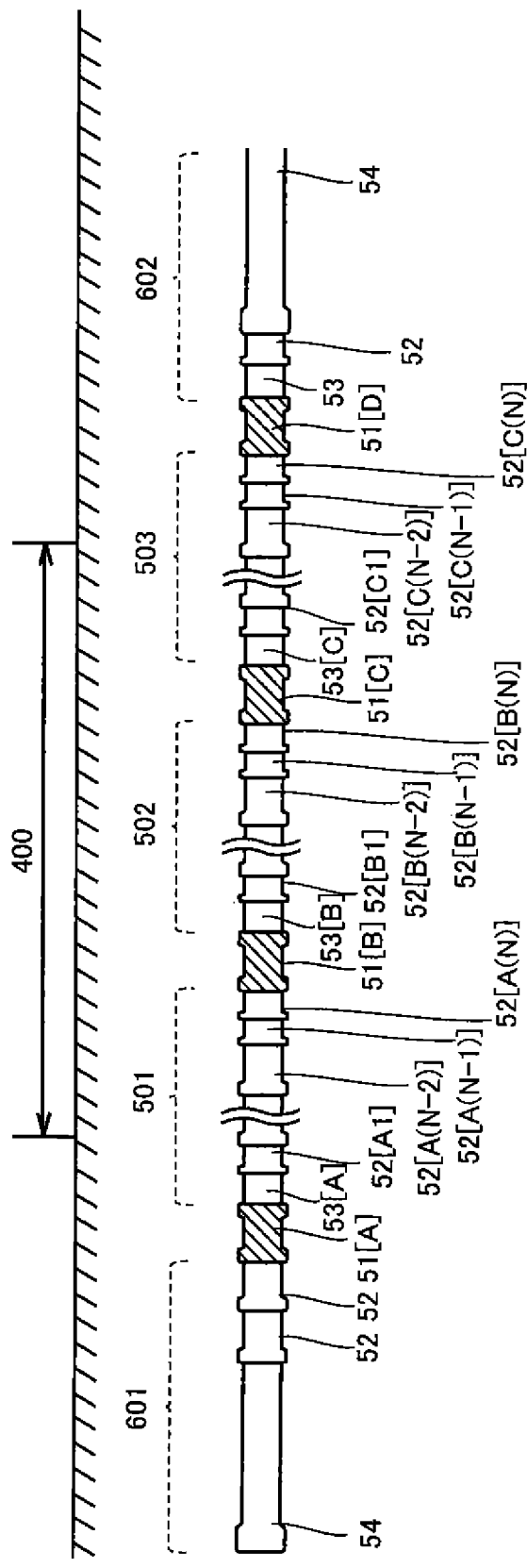
FIG. 13 is a view showing an example of using four collars 51 in a zone where a fault displacement is expected to occur.

FIG. 13 is a view showing an example of using four collars 51 in a zone where a fault displacement is expected to occur. In the example shown in FIG. 13, four collars 51 (collars 51[A], 51[B], 51[C], and 51[D]) are arranged in a zone 400 where a fault displacement is expected to occur. Three inter-collar pipelines (a pipeline 501, a pipeline 502 and a pipeline 503) are formed among these four collars 51. An extra-collar pipeline 601 is connected to collar 51[A] and an extra-collar pipeline 602 is connected to collar 51[D]. The pipeline is formed by connecting the plurality of pipes to one another by the joints.

In the example shown in FIG. 13, two short pipes 52 are connected to one end of the collar, and B-type cut pipe 53 and short pipe 52 are connected to the other end of the collar. For example, pipeline 501 is formed by connecting a B-type cut pipe 53[A], a short pipe 52[A1] . . . a short pipe 52[A(N−1)], and a short pipe 52[A(N)] to one another by the joints. Pipeline 502 and pipeline 503 are also similarly formed by connecting these pipes by the joints.

Figure 14:
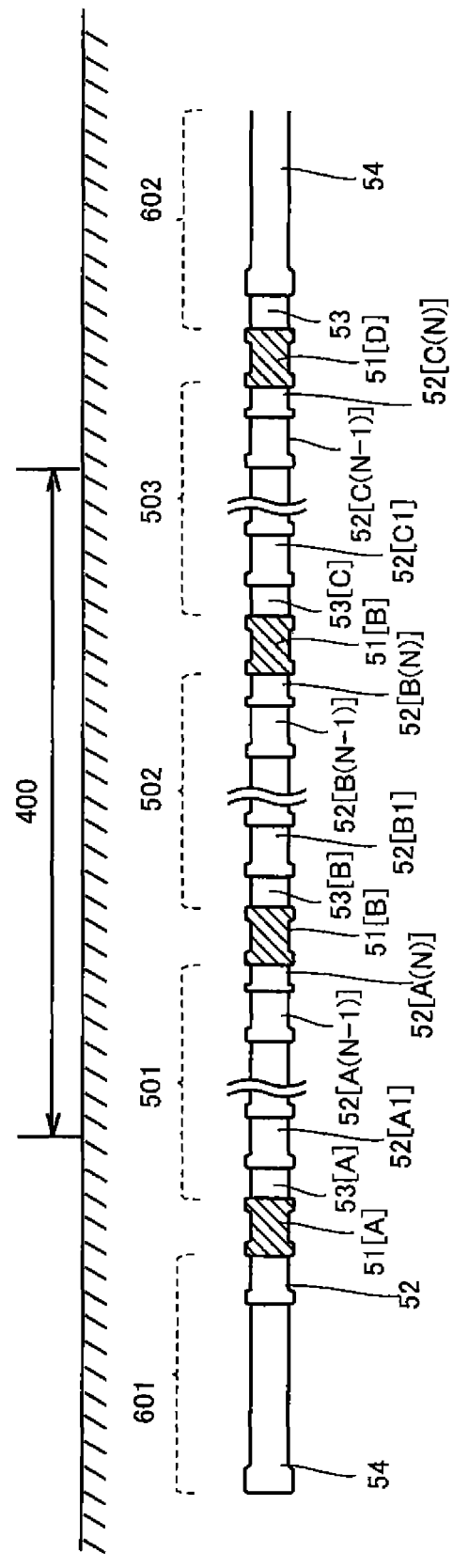
FIG. 14 is a view showing another example of using four collars 51 in a zone where a fault displacement is expected to occur.

FIG. 14 is a view showing another example of using four collars 51 in a zone where a fault displacement is expected to occur. In the example shown in FIG. 14, three inter-collar pipelines are formed similarly to FIG. 13. In the example shown in FIG. 14, one short pipe 52 is connected to one end of the collar, and one B-type cut pipe 53 is connected to the other end of the collar.

(4) According to the pipeline having the pipeline structure described in the aforementioned embodiments, a ground displacement can be followed, regardless of the fault type such as a normal fault, a reverse fault or strike slip. In addition, since a ground displacement is followed by using the pipes in the pipeline and using the joint structure for connecting the pipes, a conventional member can be used as a member for joining the pipes and the pipeline can be buried at low cost. Furthermore, the collars can be placed in accordance with the fault structure and the fault size. For example, the collars can be placed to deal with a displacement in the extension direction, a displacement in the compression direction, and the like. Since a ground displacement in the extension/retraction direction can be dealt with by using the collars, breakage of the pipes caused by severe contact between the tip ends of the spigots, detachment of the pipe and the like can be prevented. Namely, even after a ground displacement, a continuously usable state of the pipeline can be maintained.

According to the pipeline structure described in the embodiments, comparing the inter-collar pipeline and the extra-collar pipeline of the same length, the number of joints is larger in the inter-collar pipeline than in the extra-collar pipeline, the inter-collar pipeline being a pipeline formed by connecting the plurality of pipes to one another by the joints and having the collars connected to opposing ends thereof, and the extra-collar pipeline being a pipeline located at the other of said collars. With such a configuration, the number of joints that can deal with a ground displacement is increased. As a result, the pipeline can also deal with (absorb) a larger ground displacement, and it is possible to enhance the possibility that the pipeline can follow a fault displacement without being broken even when the displacement occurs.

According to the program for the pipeline structure described in the embodiments, the pipeline structure that can deal with (absorb) a large ground displacement can be easily designed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A pipeline structure of a buried pipeline, comprising:
a first collar and a second collar spaced apart from each other; and
a plurality of pipes, said pipes being connected to one another by joints,
wherein:
an inter-collar pipeline is formed of said pipes disposed between said first collar and said second collar,
an extra-collar pipeline is formed of said pipes disposed exterior to said first collar and said second collar,
said inter-collar pipeline includes (i) at least one pipe with spigots at both opposing ends thereof and (ii) a first pipe and a second pipe such that a spigot of said first pipe is inserted into a socked of said second pipe,
said extra-collar pipeline includes at least one pipe with a spigot at one end thereof, and
comparing said inter-collar pipeline and said extra-collar pipeline of the same length, a number of joints is larger in said inter-collar pipeline than in said extra-collar pipeline.

2. The pipeline structure according to claim 1, wherein:
a pipe joint structure for connecting said plurality of pipes to each other has such a structure that a first spigot formed at an end of one of the pipes is inserted into a socket formed at an end of another pipe, and said socket and said spigot can relatively allow movement in a pipe axis direction and in a direction perpendicular to a pipe axis, and
a collar joint structure for connecting said collar and one of the pipes has such a structure that a second spigot of one of the pipes is inserted into an end of said collar, and said collar and said second spigot can relatively allow movement in the pipe axis direction.

3. The pipeline structure according to claim 2, wherein an amount of extension/retraction of said collar joint structure in the pipe axis direction is larger than an amount of extension/retraction of said pipe joint structure in the pipe axis direction.

4. The pipeline structure according to claim 1, wherein said pipes include a long pipe having a first length in a pipe axis direction and a short pipe having a second length shorter than said first length in the pipe axis direction, and at least said short pipe is included in said inter-collar pipeline.

5. The pipeline structure according to claim 1, wherein spigots are inserted from opposing ends of said collar in a pipe axis direction.

6. The pipeline structure according to claim 1, wherein:
a collar joint structure for connecting said collar and said pipe has such a structure that a spigot of said pipe is inserted into an end of said collar, and said collar and said spigot can relatively allow movement in a pipe axis direction,
said pipes include a long pipe having a first length in the pipe axis direction and a short pipe having a second length shorter than said first length in the pipe axis direction, and at least said short pipe is included in said inter-collar pipeline, and said pipe used in said collar joint structure is said short pipe.

7. The pipeline structure according to claim 1, wherein an inner diameter of a part of said collars in an axial direction is smaller than an outer diameter of a spigot of said pipe.

8. The pipeline structure according to claim 2, wherein:
said pipeline structure is buried in a ground having a fault, and
said pipeline structure includes the number of said pipe joint structures that can absorb an amount of expected ground displacement in the direction perpendicular to the pipe axis in a range where said pipeline structure is buried.

9. The pipeline structure according to claim 1, wherein:
said pipeline structure is buried in a ground having a fault, and
said two collars are arranged at a position where said fault is sandwiched between said two collars.

10. The pipeline structure according to claim 1, wherein:
said pipeline structure is buried in a ground having a fault, and
a plurality of fault-resistant pipeline structures each formed of said collars and said inter-collar pipeline are arranged continuously.

11. A computer readable recording medium having recorded thereon a program for the pipeline structure for causing a computer to output pipeline structure data indicating the pipeline structure as recited in claim 1, wherein
said computer includes a processor and a memory,
said memory is configured to store fault condition data indicating an amount of fault displacement and a fault intersection angle in a range where said pipeline is buried as well as displacement absorption amount data indicating an amount of displacement in a direction perpendicular to a pipe axis that can be absorbed by said joint structure, and
said program for the pipeline structure causes said processor to perform the steps of:
obtaining information about a distance between said two collars spaced apart from each other, in the range where said pipeline is buried;
calculating perpendicular direction displacement data indicating an amount of ground displacement in the direction perpendicular to the pipe axis of said pipeline structure, based on said fault condition data in the range where said pipeline is buried;
generating, by computation, number-of-joints information indicating the number of joints that can absorb the amount of ground displacement in the direction perpendicular to the pipe axis, based on said perpendicular direction displacement data and said displacement absorption amount data; and
determining said pipeline structure based on said distance information and said number-of-joints information, and outputting pipeline structure data indicating said determined pipeline structure.

* * * * *